Oct. 17, 1967

C. H. FREI 3,347,374

GYRATORY SIFTER MOUNT

Filed Feb. 1, 1965

INVENTOR.
Charles H. Frei
BY
Wood, Herron & Evans.
ATTORNEYS.

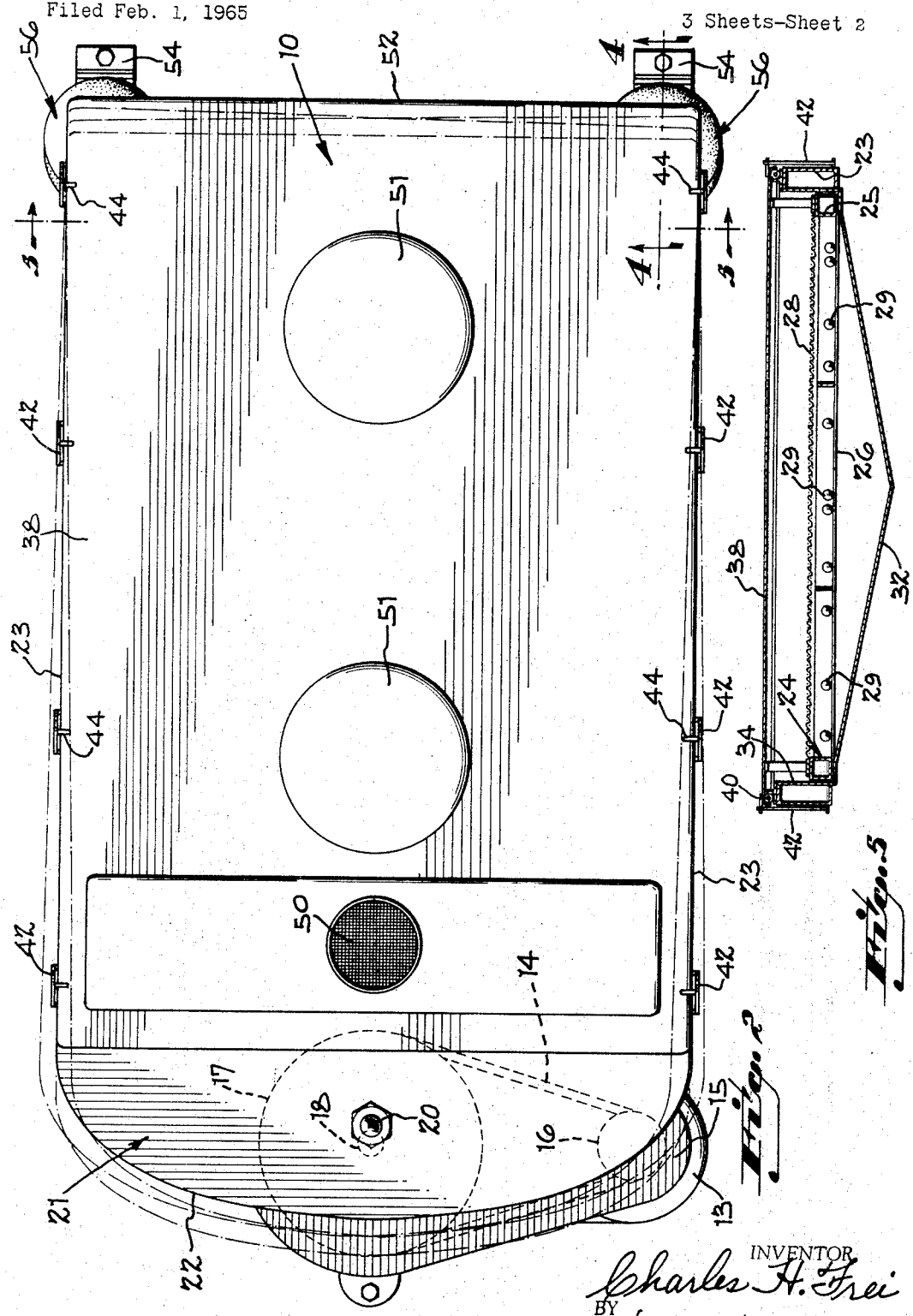

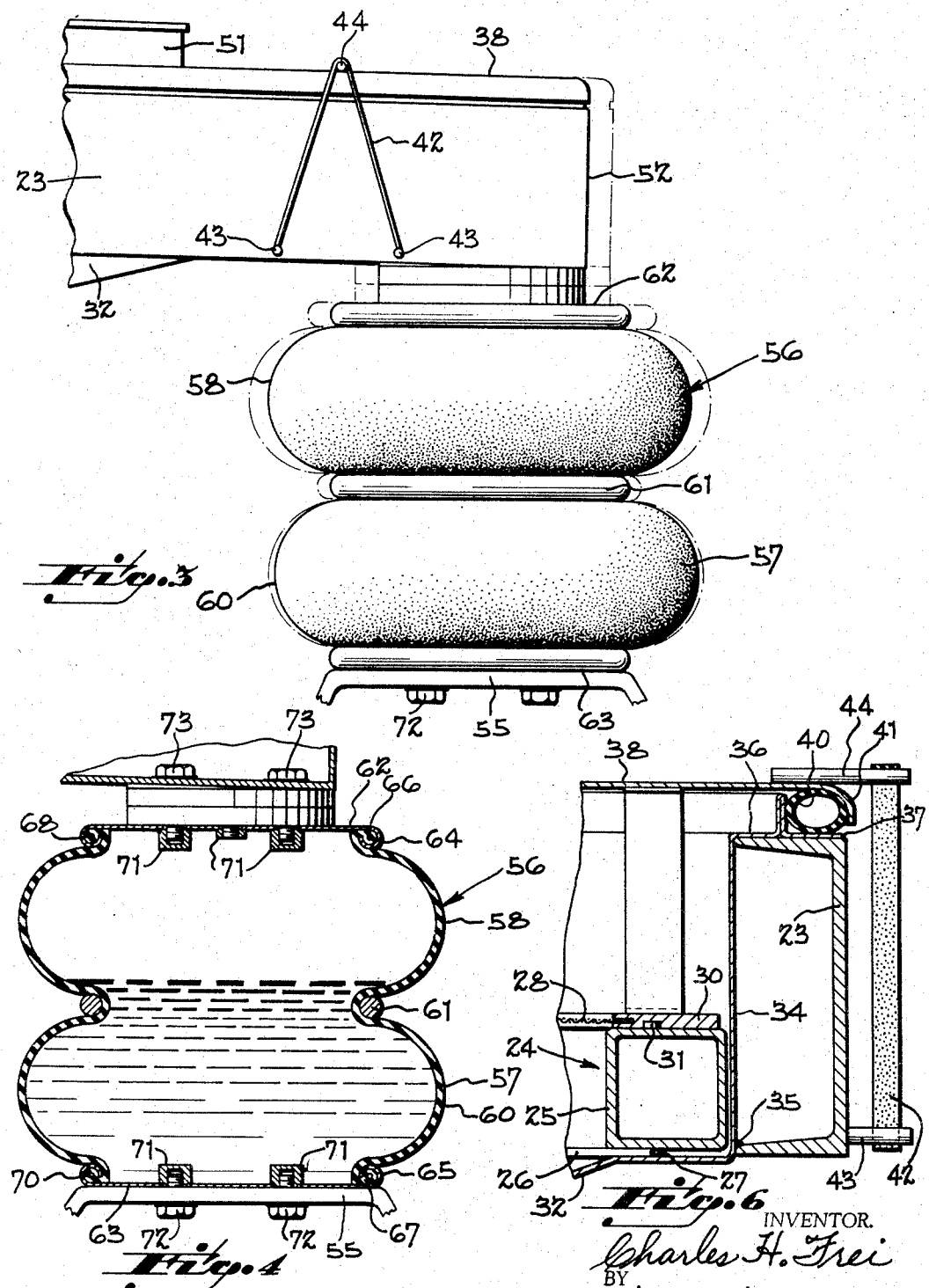

United States Patent Office 3,347,374
Patented Oct. 17, 1967

3,347,374
GYRATORY SIFTER MOUNT
Charles H. Frei, Cincinnati, Ohio, assignor to The J. H. Day Company, Cincinnati, Ohio, a corporation of Delaware
Filed Feb. 1, 1965, Ser. No. 429,441
4 Claims. (Cl. 209—332)

ABSTRACT OF THE DISCLOSURE

A gyratory sifter including a generally horizontal screen and an eccentric drive mechanism for imparting a gyratory motion to the head end. The tail end is mounted upon two air mount members having a generally vertical axis, the air mount members being partially filled with water and partially filled with air under pressure.

---

This invention relates to sifters and is particularly directed to a novel mount for the tail end of a gyratory type sifter.

Gyratory sifters have found wide applications in sifting many different types of products, such as sugar, flour and other powdery materials. These sifters conventionally include a large, generally rectangular screen supported in a generally horizontal plane, but sloping slightly from the head end to the tail end. An eccentric drive mechanism is provided for imparting a gyratory motion to the head end of the sifter. The tail end of the sifter undergoes an oscillatory movement; and in the past a complex slide bearing and stabilizing mechanism has been provided to support this end of the sifter. While this arrangement was practiced, it suffered from two defects. In the first place, operation of the sifter resulted in a highly objectionable amount of vibration being transmitted to the building floor in which the sifter was located. Also, the bearing structure required a large number of parts which not only made it expensive to fabricate, but also rendered it difficult to properly maintain.

The present invention is predicated upon the concept of eliminating the slide bearing and stabilizing mechanism and providing instead air mount members for supporting the tail end of the sifter. In accordance with the present invention, the sifter screen assembly is supported entirely on two air mount members which are disposed beneath the screen frame and are interposed between the screen frame and a rigid support member.

The present concept of utilizing an air mount as a bearing is totally different from the conventional use of these members as a spring; for in the present embodiment, the axis of the spring members is disposed in a vertical plane while the oscillatory motion of the tail end of the sifter frame is horizontal. Thus, instead of undergoing the usual axial compression, the present air mounts undergo a sideways bending motion.

A further concept of the present invention is to provide air mount members which are partially filled, e.g. half filled with a liquid such as water. I have empirically determined that the utilization of such liquid filled air mount members substantially reduces the longitudinal oscillation imparted to the rigid support member at the tail end and the support members at the head end of the sifter. As a result of this surprising decrease in vibration, it is possible to operate the present sifter under heavier loads and at higher speeds than was heretofore possible.

Another advantage of the present sifter mount is that it substantially reduces the number of parts required to support the tail end. In one sifter, for example, the number of parts was reduced ten-fold, from 125 to 12. Consequently, the present sifter structure is more economical to manufacture. Moreover, the present sifter is substantially easier and less expensive to maintain.

These and other objects and advantages of the present invention will be more readily apparent from the following detailed description of the drawings illustrating a preferred embodiment of the invention.

In the drawings:

FIGURE 2 is a top plan view of the sifter shown in FIGURE 1.

FIGURE 3 is an enlarged partial front elevational view of the present suspension.

FIGURE 4 is partial cross sectional view taken along line 4—4 of FIGURE 2.

FIGURE 5 is a cross sectional view taken along line 5—5 of FIGURE 2.

FIGURE 6 is an enlarged sectional view of the screen frame and cover, the view corresponding to the right-hand portion of FIGURE 5.

Figure 1:
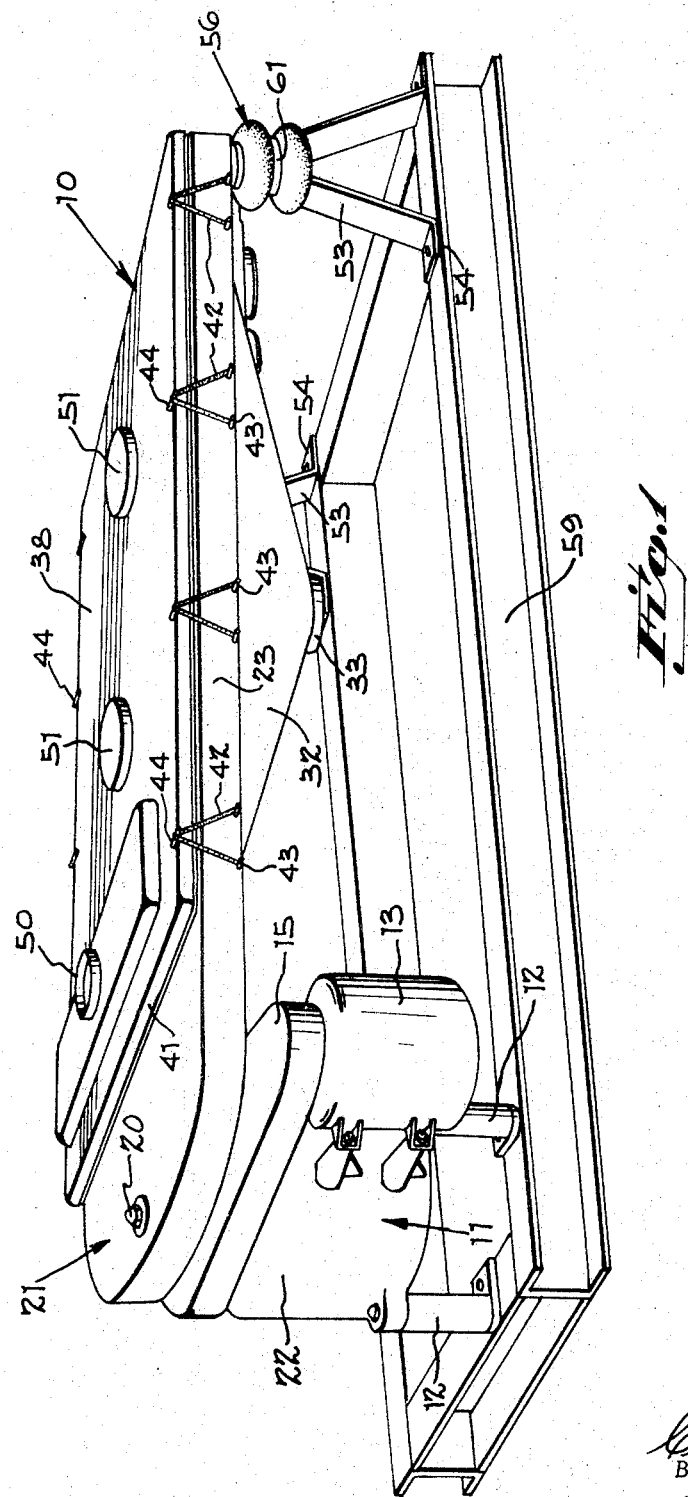
FIGURE 1 is a preferred embodiment of a sifter provided with the present suspension.

The overall construction of a gyratory sifter constructed in accordance with the principles of the present invention is shown in FIGURES 1 and 2. As there shown, the sifter 10 comprises a drive head asembly 11 mounted upon the supports 12 at the head end of the sifter. An electric motor 13 is mounted on the drive head assembly 11 and is drivingly connected therewith by means of belts 14 disposed within guard cover 15. Belts 14 pass over a drive pulley 16 carried by the shaft of motor 13 and around a large pulley 17 mounted on shaft 18.

Pulley 17 carries an eccentric drive pin 20 which extends upwardly from the pulley and is secured to the main sifter assembly 21. It will be understood that pulley shaft 18 extends downwardly and is rotatably journalled in head assembly 11. Suitable counterweights (not shown) are mounted on shaft 18 for rotation within housing 22 of the head assembly.

Sifter asembly 21 comprises longitudinal side members 23 preferably formed of angle irons. These longitudinal side frame members are adapted to support a sieve frame 24. The sieve frame 24 is a generally rectangular framework formed of tubular members 25. These members carry a transverse ball support screen 26 which extends across the lower portion of the sifter assembly, the screen being joined to tubular member 25 in any suitable way, such as by welding at 27. Ball support screen 26 is a coarse mesh screen effective to support a plurality of rubber balls 29 mounted above the screen.

The upper wall of the tubular frame carries a transversely extending screen cloth 28. The screen cloth is mounted in any suitable way in a peripheral clamping member 30, which member is in turn secured to the upper edge of tubular frame member 25 by means of pins 31 which fit into aligned openings formed in clamping member 30.

The sifter also comprises a bottom pan member 32 effective to receive the sifted material and including discharge port 33. As is best shown in FIGURES 3 and 6, bottom pan 32 includes upper side wall portions 34 which extend upwardly around tubular sieve frame 24. These upper wall sections are welded to longitudinal frame members 23 as at 35 and include an upper peripheral flange 36 which overlies the upper surface of frame member 23 and is welded thereto as at 37.

A suitable cover member 38 is placed over the sifter assembly. A tubular gasket 40 is compressed between an arcuate flange 41 of the cover member and flange 36 of the pan. The cover member is held in position in any suitable manner, such as by means of resilient bands 42, the ends of which engage pins 43 extending outwardly from the lower portion of side frame members 23. Bands 42 pass over pins 44 carried by the cover member so that the tension in these bands holds the cover member down tightly in place, gasket 40 being compressed sufficiently to provide an effective seal. Cover member 38 is provided with an intake port 50 and inspection ports 51.

Those portions of the sifter thus far described constitute no portion of the present invention and it is contemplated that other forms of screen mounts and oscillatory head drives, such as those shown in Nicholls Patent No. 2,395,138, for example, can be employed if desired.

The novel feature of the present invention resides in the support and mount for the tail end 52 of the movable screen assembly. This mount is effective to support the tail end for oscillatory movements of substantial magnitude, for example, two and one-half inches, incident to the gyratory movement imparted to the head end of the screen by the eccentric movements of pin 20.

More specifically, the tail end mount comprises two support legs 53. These legs include feet 54 adapted to be bolted or otherwise secured to a stationary base frame 59 or to the floor if no base frame is utilized. Each of the support legs 53 also includes an upper transverse wall 55 adapted to support pneumatic air mount members 56.

One particularly satisfactory form of air mount is sold by Firestone Industrial Products Company and is identified as "Firestone No. 26 Airide." This air mount member comprises a reinforced rubber tube 57 configurated in upper and lower convolutions 58 and 60 by means of a girdle hoop 61. The upper and lower ends of the air spring are enclosed by cap members 62 and 63. Each of these cap members is formed of a relatively rigid material, such as metal. The cap members extend across and enclose the end of the rubber tubular member, the peripheral portion 64 and 65 of the cap members being crimped over enlarged beads 66 and 67 formed on the upper and lower edges of the tubular member 57. It will be appreciated that these beads are preferably provided with a metal or other reinforcing wire, such as wires 68 and 70. The upper and lower caps 62 and 63 are also provided with integral bosses 71 for threadably receiving bolts 72 for securing the bottom cap 63 to support stands 55 and bolts 73 for securing the upper cap 62 to the bottom bearing plate carried by the sifter frame.

In accordance with the present invention, each of the air mount members is partially filled with a suitable liquid, preferably water. I have empirically determined that for many uses optimum performance of the sifter is obtained when the air mount members are filled to the order of one-half full. The exact proportion of the air mount's volume which should be filled with liquid can be determined for each machine and will vary somewhat with the weight of the machine and the weight of the material being processed. When material to be processed is introduced through filling port 50, the total weight carried by the air mounts results in a build-up of internal air pressure within the tube 57 to a pressure of the order of three pounds per square inch. It is to be understood that water is introduced into the air mounts through a suitable nipple (not shown) threaded into an opening in one of the end caps and communicating with the interior of tubular member 57. After filling, the nipple is sealed by a conventional cap (not shown).

In operation, material to be sifted is introduced through inlet port 50 above screen 28. Motor 13 rotates pulley 17 through belt drive 14. Eccentric pin 20 carried by pulley 17 imparts a gyratory motion to the head end of the sifter assembly. This gyratory motion may be of the order of four cycles per second. A large portion of the material being treated passes downwardly through the screen cloth 28 and through the coarse ball retaining screen 26 and drops into the pan member 32. The sifting screen 28 slopes downwardly toward the tail end of the sifter. The tailings are discharged through a conventional discharge port (not shown) disposed at the tail end of the sifter. Clogging of the upper screen 28 is prevented by the rebound action of rubber balls 29 which bounce upwardly against the undersurface of screen 28 to keep that screen in a state of vertical vibration.

As a result of the gyratory motion imparted to the head end of the screen assembly, the tail end of the sifter oscillates back and forth in a substantially horizontal plane undergoing a substantial displacement of the order of two and one-half inches transverse to the vertical axis of said air mount member.

It has been empirically discovered that in a sifter provided with the present bearings, the motion which is transferred to base frame 59, i.e., the longitudinal displacement of the frame, is reduced by an amount of the order of 60% as compared to a sifter provided with slide-type bearings of the type shown in Nicholls Patent No. 2,395,138. I have attributed this substantial decrease in motion largely to the damping effect of the water carried by tubes 57. This water effectively damps out a substantial portion of the inertial forces present in the operation of the sifter.

From the above disclosure of the general principles of the present invention and the detailed description of one preferred embodiment, those skilled in the art will readily comprehend various modifications to which the invention is susceptible. Accordingly, I desire to be limited only by the scope of the following claims.

Having described my invention, I claim:

1. A sifter construction comprising a screen assembly including a screen cloth, said sifter assembly having a head end and a tail end, means for imparting a gyrating motion in a generally horizontal plane to said head, and means supporting said tail end for oscillatory movement, said last named means comprising an air mount member, means mounting said air mount member to the screen assembly adjacent to the tail end thereof with the axis of said air mount member substantially vertical, a rigid support member, and means interconnecting said rigid support member and said air mount member, said air mount member being interposed between said support member and said sifter assembly, said air mount member supporting said tail end of said sifter assembly for oscillating movements in a generally horizontal plane transverse to the axis of said air mount member, said air mount member comprising a flexible tubular member, liquid partially filling the lower portion of said tubular member and air under pressure above said liquid and in contact therewith.

2. A sifter construction comprising a screen assembly including a screen cloth, said sifter assembly having a head end and a tail end, means for imparting a gyrating motion in a generally horizontal plane to said head, and means supporting said tail end for oscillatory movement, said last named means comprising an air mount member, means mounting said air mount member to the screen assembly adjacent to the tail end thereof with the axis of said air mount member substantially vertical, a rigid support member, and means interconnecting said rigid support member and said air mount member, said air mount member being interposed between said support member and said sifter assembly, said air mount member supporting said tail end of said sifter assembly for oscillating movements in a generally horizontal plane transverse to the axis of said air mount member, said air mount member comprising a flexible tubular member, water filling approximately the bottom one-half of said tubular member and air under pressure above said water and in contact therewith.

3. A sifter construction comprising a screen assembly including a screen cloth, said sifter assembly having a head end and a tail end, means for imparting a gyrating motion in a generally horizontal plane to said head, and means supporting said tail end for oscillatory movement, said last named means comprising an air mount member, means mounting said air mount member to the screen assembly adjacent to the tail end thereof with the axis of said air mount member substantially vertical, a rigid support member, and means interconnecting said rigid support member and said air mount member, said air mount member being interposed between said support member and said sifter assembly, said air mount member supporting said tail end of said sifter assembly for oscillating movement in a generally horizontal plane transverse to the axis of said air mount member, said air mount member comprising a flexible tubular member and liquid partially filling the lower portion of said tubular member and air under pressure above said liquid and in contact therewith, the amount of liquid within said tubular member, the size of said tubular member and the weight carried by said air mount member being related so that the air pressure within said tubular member is of the order of 3 p.s.i.

4. A sifter construction comprising a screen assembly including a screen cloth, said sifter assembly having a head end and a tail end, means for imparting a gyrating motion in a generally horizontal plane to said head, and means supporting said tail end for oscillatory movement, said last named means comprising an air mount member, means mounting said air mount member to the screen assembly adjacent to the tail end thereof with the axis of said air mount member substantially vertical, a rigid support member, and means interconnecting said rigid support member and said air mount member, said air mount member being interposed between said support member and said sifter assembly, said air mount member supporting said tail end of said sifter assembly for oscillating movements in a generally horizontal plane transverse to the axis of said air mount member, said air mount member comprising a tubular member, a girdle hoop surrounding said tubular member and compressing the center portion thereof, whereby said tubular member is configurated of a double convolution the lowermost convolution of, said tubular member being partially filled with liquid and the uppermost convolution being filled with air under pressure.

References Cited
UNITED STATES PATENTS

| | | | |
|---|---|---|---|
| 2,536,626 | 1/1951 | Coleman | 267—64 |
| 3,003,035 | 10/1961 | Wood | 209—415 |
| 3,014,587 | 12/1961 | Philippovic | 209—326 |
| 3,034,803 | 5/1962 | Doulgheridis | 267—64 X |
| 3,101,315 | 8/1963 | Denovan | 209—332 |
| 3,261,592 | 7/1966 | Dumbaugh | 259—72 X |

HARRY B. THORNTON, *Primary Examiner.*

R. HALPER, *Assistant Examiner.*